United States Patent [19]

Graves

[11] 4,295,627
[45] Oct. 20, 1981

[54] SPRING SUSPENSIONS FOR VEHICLE SEATS

[75] Inventor: Kevin Graves, Cogenhoe, England

[73] Assignee: UOP Inc., Des Plaines, Ill.

[21] Appl. No.: 84,925

[22] Filed: Oct. 15, 1979

[30] Foreign Application Priority Data

Oct. 19, 1978 [GB] United Kingdom ............... 41225/78

[51] Int. Cl.$^3$ ........................... B60N 1/02; A47C 3/22
[52] U.S. Cl. .................................... 248/588; 248/564; 248/569; 248/590; 297/304
[58] Field of Search ............... 248/564, 569, 588, 587, 248/590, 591, 429, 430; 297/346, 304, 305

[56] References Cited

U.S. PATENT DOCUMENTS

| 3,100,617 | 8/1963 | Radke et al. ...................... 248/430 |
| 3,109,621 | 11/1963 | Simons et al. ...................... 248/564 |
| 3,258,241 | 6/1966 | Oswald .............................. 248/430 |
| 3,826,457 | 7/1974 | Longchamp ...................... 248/564 |
| 4,195,883 | 4/1980 | Ronnault et al. .................. 248/564 |

FOREIGN PATENT DOCUMENTS 2721926 12/1977 Fed. Rep. of Germany ...... 248/429

*Primary Examiner*—James T. McCall
*Attorney, Agent, or Firm*—James R. Hoatson, Jr.; Barry L. Clark; William H. Page II

[57] ABSTRACT

A vehicle seat suspension, of the type comprising a seat frame supported on a base frame by two spaced pairs of scissor action linkage arms, has the ends of the linkage arms connected to one of the frames wholly by pivotal connections having freedom for displacement longitudinally of the suspension and a resilient coupling connecting the one frame to one of the linkage arms to damp the transmission of vibrations between the frames in the longitudinal direction.

5 Claims, 5 Drawing Figures

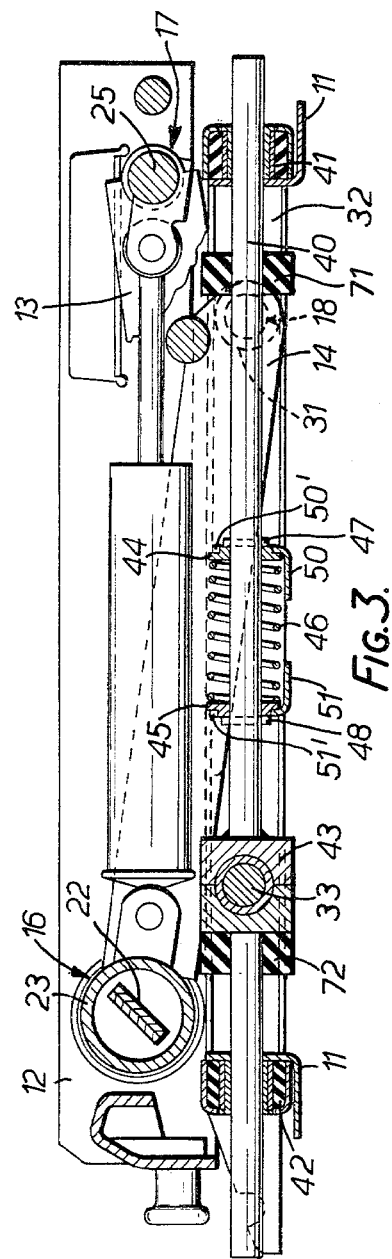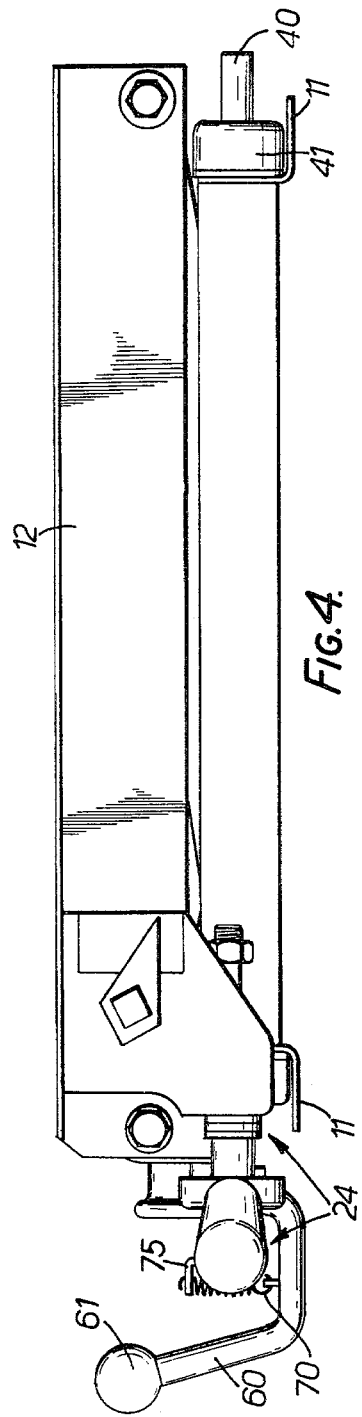

SPRING SUSPENSIONS FOR VEHICLE SEATS

BACKGROUND OF THE INVENTION

This invention relates to spring suspensions for vehicle seats.

It is well known to provide a spring suspension for a vehicle seat, the suspension comprising a seat frame and a base frame interconnected by a scissor-action linkage arm system, the system including two pairs of scissor-action linkage arms spaced apart on a common pivot axis, said arms having pivotal interconnections at their opposite ends with said frames, to permit the frames to move towards and away from one another, each pivotal connection on one pair of arms being coaxial with a corresponding pivotal connection on the other pair of arms, and a biassing spring connected between parts of the suspension which pivot relatively to one another during relative movement of the frames towards or away from each other, to bias the two frames away from one another. A vehicle seat incorporating such a suspension is described in U.S. Pat. No. 3,109,621.

Such a vehicle seat spring suspension is very effective in isolating the seat occupant from vibrations transmitted in a vertical direction from the base frame to the seat frame, but has little if any effect on vibrations transmitted between the base frame and seat frame in a direction longitudinally of the suspension (i.e. in the fore-and-aft direction). The seat occupant can be isolated from such longitudinal vibrations by mounting the seat suspension on a mechanism designed to isolate longitudinal vibrations, but such a mechanism increases the space necessary to accommodate the seat and adds considerably to cost.

There is therefore a requirement, in a spring suspension of the type described, for simple and inexpensive means for damping vibrations transmitted between the base frame and seat frame in the longitudinal direction.

SUMMARY OF THE INVENTION

The above-mentioned requirement is met, in accordance with the invention, by all of the pivotal connections between one of said frames and the adjacent ends of the linkage arms connected thereto being displaceable connections extending in a common direction to permit both relative pivotal movement between the linkage arms of each pair and relative translational movement between all the linkage arms and said one frame, and a motion limiting resilient coupling including an anchoring spring of limited expansion and contraction connected between said one frame and the linkage arm system to permit relative translational movement along said common direction between the whole linkage arm system and said one frame within the limits of expansion and contraction of the spring thereby reducing the transmission of vibration in said common direction between the base frame and the seat frame.

In particular, the resilient coupling includes a manually operable locking device connected between said one frame and at least one linkage arm which, in its inoperative state, permits said relative translational movement between said one frame and the linkage arm system under the restraint of the anchoring spring, and in its operative state locks said one frame to at least one said linkage arm to prevent said relative translational movement.

BRIEF DESCRIPTION OF THE DRAWINGS

One embodiment of a spring suspension in accordance with the present invention will now be described by way of example only with reference to the accompanying drawings in which:

FIG. 3 is a section on the line III—III of FIG. 2, showing the suspension in its down-stop position;

FIG. 4 is a side elevation of the spring suspension of FIG. 2 seen from the right-hand side of FIG. 2.

DESCRIPTION OF THE PREFERRED EMBODIMENTS

Figure 1:
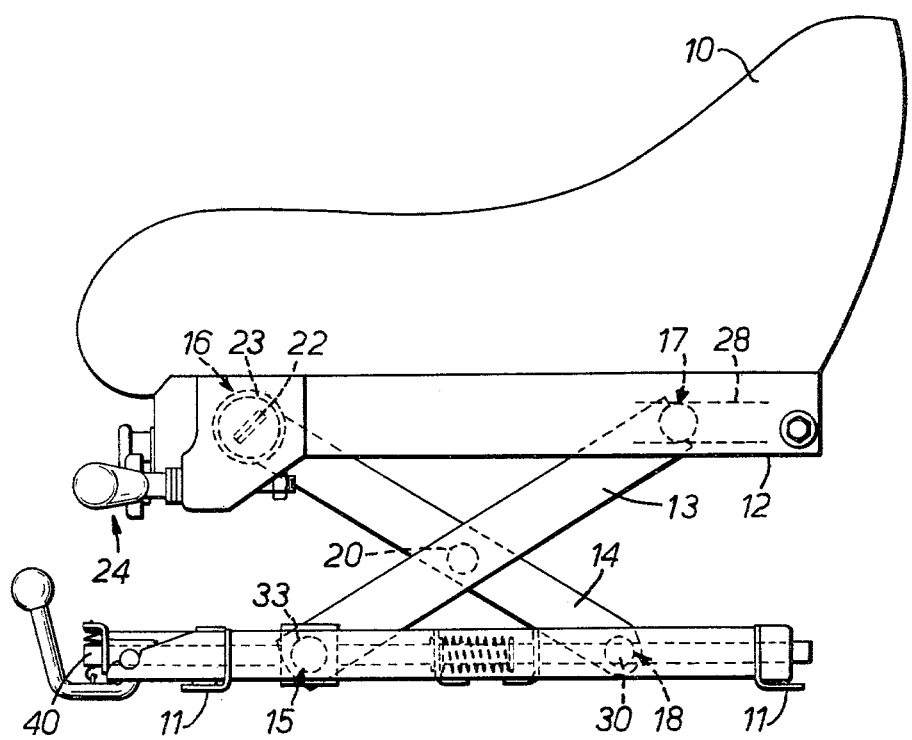
FIG. 1 is a side elevation of a vehicle seat incorporating a scissor-action linkage arm suspension to which the present invention is directed.

As shown in the drawings, the spring suspension, in the basic form shown in FIG. 1, comprises a base frame 11, a seat frame 12 on which a seat part 10 can be mounted, and two horizontally spaced pairs of scissor-action linkage arms 13, 14 (only one pair being seen in FIG. 1), the linkage arms 13, 14 having pivotal connections 15, 16 at their forward ends to the base frame 11 and seat frame 12 respectively, and further pivotal connections 17, 18 at their rearward ends to the seat frame 12 and base frame 11 respectively. Only one each of connections 15–18 are seen in FIG. 1. The arms 13, 14 of each pair are pivotally interconnected on the common scissors axis at their intersection 20.

A torsion bar spring 22, for biassing the seat frame away from the base frame, is mounted within a torsion bar tube 23 which is rigidly secured to the upper forward ends of linkage arms 14. The opposite ends of tube 23 are journalled in bearings in the sides of the seat frame, these bearings forming the pivotal connections 16. The torsion bar spring 22 is secured at one end thereof to one end of the tube 23 and at its opposite end to the seat frame 12 via a manually-operable preload-adjusting screw mechanism 24 by operation of which the preload in the torsion bar can be varied. The details of the screw mechanism 24 form no part of the present invention but are described in the above-mentioned Patent Specification.

In the suspension shown in FIG. 1, the upper ends of linkage arms 13 are interconnected by a transverse shaft 25 whose ends 26 support rollers 27. The rollers 27 engage in guides 28 mounted on and extending longitudinally of the seat frame 12 to permit relative sliding movement between the upper ends of arms 13 and the seat frame 12. Sliders could be used throughout instead of rollers.

Similarly, pivot pins 30 are provided on the lower ends of linkage arms 14 to support rollers 31 engaging in guides 32 which permit relative sliding movement in the fore and aft direction between the lower ends of linkage arms 14 and the base frame 11.

Although, in the prior art suspension illustrated in the above-mentioned Patent, the pivotal connections 15 between linkage arms 13 and base frame 11 were fixed pivotal connections, in the present embodiment, these connections are formed as sliding connections, and a motion limiting coupling device, including an anchoring spring, is connected between the linkage arm system and the base frame to provide vibrational isolation yet limit relative translational movement therebetween.

Figure 2:
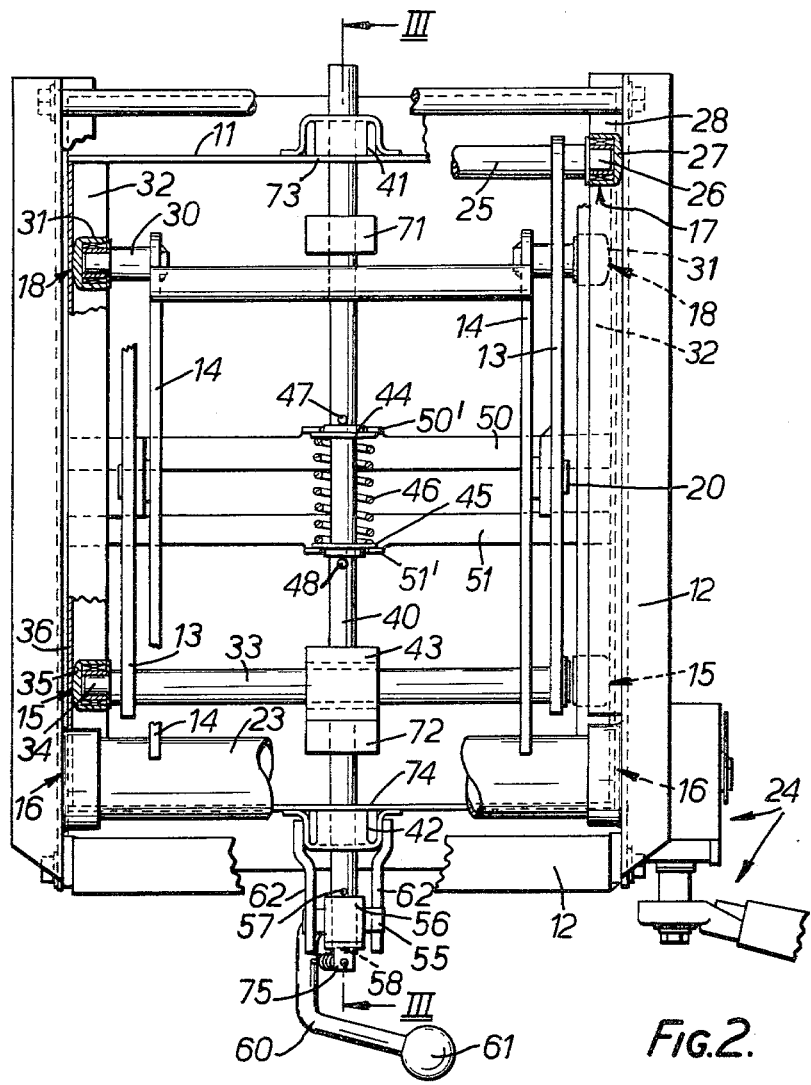
FIG. 2 is a plan view of the spring suspension, in accordance with the present invention, shown in FIG. 1.
Figure 5:
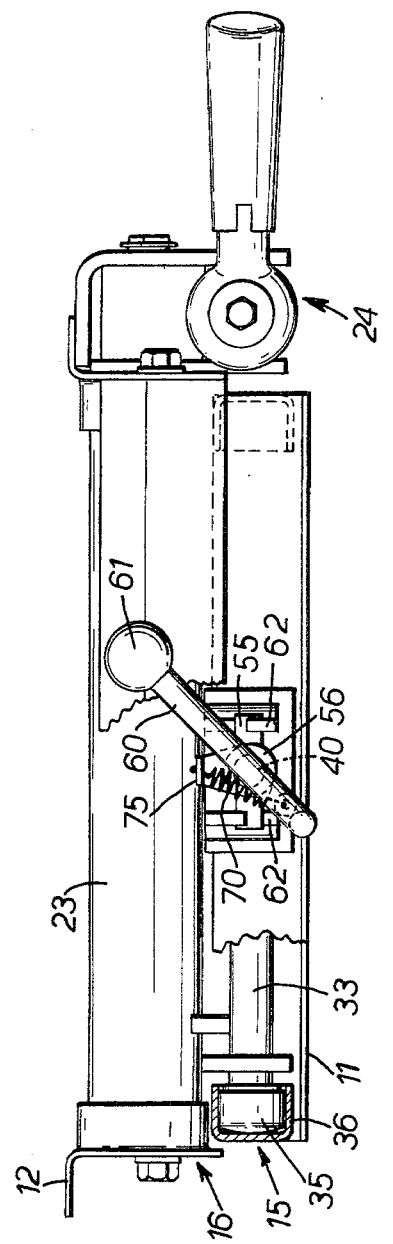
FIG. 5 is a front view of the spring suspension of FIG. 2.

In particular (as shown in FIG. 2) a transverse shaft 33 interconnects the lower ends of linkage arms 13, the shaft 33 having its opposite ends 34 engaging in rollers 35 which roll in guides 36. The motion limiting device takes the form of a shaft 40 which extends along the fore and aft centre line of the seat and is located in a flexible bush 41 at the rear of the base frame and a flexible bush 42 at the front of the base frame, and is connected to a split bearing 43 which embraces the transverse shaft 33. As shown, the shaft 40 is formed of two parts separated by the bearing 43.

The forward and rear flexible bushes 42,41 have high lateral stiffness and low vertical stiffness so that the main support for the suspension is through the rollers 31, 35 and is not influenced by the support of the central shaft 40. Any "yawing" tendency of the suspension is resisted by the high lateral stiffness of the bushes 41, 42.

The shaft 40 also supports two apertured spring-supporting plates 44, 45 between which a helical spring 46 is compressed, the plates 44, 45 being secured against movement away from each other by pins 47, 48 passing through the shaft 40. Movement of the plate 44 in a rearward direction and movement of plate 45 in a forward direction is prevented by two locating plates 50, 51, mounted on the base frame and having upturned supporting lugs 50',51' having apertures through which the shaft passes and within which stepped portions of plates 44, 45 are received.

It will be seen therefore that if a vibration applied to the base frame 11 causes it to move forwardly relative to the seat part 10, the transverse shaft 33 moves in a rearward direction relative to base frame 11, and this movement is transmitted through bearing 43 and shaft 40 to plate 48. Plate 48 thus moves rearwardly against the force of spring 46 which is supported through plate 44 on the upturned lug 50' of plate 50. Conversely, if base frame 11 moves rearwardly relative to seat part 10, the relative movement of shaft 33 is forwardly, and this movement is transmitted through bearing 43 and shaft 40 to plate 44 which moves forwardly against the force of spring 46, the latter being supported in this case by plate 45 bearing aganst lug 51'. The movement therefore of shaft 33 and hence of the entire linkage arm system in a forward or rearward direction is opposed by spring 46 and limited in extent to the extent by which resilient buffers 71, 72 mounted on the shaft 40 can move toward stops 73, 74 formed by flanges on the base frame 11. This limited movement of the linkage arm system enables vibrations acting in the fore and aft directions to be at least partially absorbed by spring 46, or in other words spring 46 acts to isolate the seat frame, at least in part, from fore and aft vibrations applied to the base frame.

In order to lock out the vibration isolator formed by the above-mentioned motion limiting device, a locking device is provided to act between shaft 40 and base frame 11. This locking device comprises a rotary locking latch 55 mounted in a sleeve 56 secured on the forward end of shaft 40 between locating pins 57, 58. These pins 57, 58 locate the sleeve 56 axially yet permit it to be rotated relative to the shaft 40. A handle 60 formed with an operating knob 61 is secured to the sleeve 56 to permit rotation of the sleeve and hence rotation of the latch 55.

A spaced pair of plates 62 positioned on opposite sides of the forward end of shaft 40 and secured to the base frame 11 are recessed adjacent their forward end to form catches co-operable with the latch 55. In one rotational position of the latch 55, the catches engage and lock the latch 55 to the plates 62 and thus prevent longitudinal movement of shaft 40 relative to the base frame. By rotation of handle 60, the latch 55 can be rotated out of engagement with the catches of the plates 62 into a position in which longitudinal movement of shaft 40 is permitted to allow the vibration isolator to be effective.

An over-centre spring 70 is provided between a point on the handle 60 and a bracket 75 fixed to the end of shaft 40 so that the latch 55 is biassed by the spring 70 into its engaged position in the plates 62 or into its disengaged position depending on which side of the centre position the spring 70 is located.

Although the suspension has been described as located with the handle 60 at the front, it may on occasion be desired that the suspension as shown in FIG. 2 be reversed relative to the seat part so that handle 60 is at the rear.

In a modification, not shown, the shaft 33 is split and secured at the adjacent ends to a supporting block which replaces bearing 43, and in this case the shaft 40 is formed in one piece and passed through this supporting block.

Although the suspension has been illustrated and described in a form in which the resilient coupling is connected between the linkage arm system and the base frame, it could alternatively be located between the linkage arm system and the seat frame. In the latter event, the biassing spring would act between the seat frame and one of the linkage arms.

I claim:

1. A spring suspension for a vehicle seat, the suspension comprising a seat frame, a base frame, a scissor-action linkage arm system interconnecting said seat frame and base frame, the system including two pairs of scissor-action linkage arms spaced apart on a common pivot axis, pivotal connections interconnecting the ends of said arms and said frames to permit the frames to move towards and away from one another, each pivotal connection on one pair of arms being coaxial with a corresponding pivotal connection on the other pair of arms, and a biassing spring connected between parts of the suspension which pivot relatively to one another during relative movement of the frames towards or away from each other to bias the two frames away from one another, all of the pivotal connections between one of said seat and base frames and the adjacent ends of the linkage arms connected to said one frame being displaceable connections extending in a common direction to permit both relative pivotal movement between the linkage arms of each pair and relative translational movement between all the linkage arms and said one frame and a motion limiting resilient coupling, including an anchoring spring of limited expansion and contraction connected between said one frame and one of said displaceable connections to the linkage arm system to permit relatively free fore and aft translational movement along said common direction between the whole linkage arm system and said one frame within the limits of expansion and contraction of the spring thereby reducing the transmission of vibration in said common direction between the base frame and the seat frame.

2. A spring suspension according to claim 1 wherein said resilient coupling includes a manually operable locking device connected between said one frame and at least one linkage arm, the locking device in its inoperative state permitting relative translational movement between said one frame and the linkage arm system under the restraint of the anchoring spring, and in its operative state locking said one frame to at least one said linkage arm to prevent said relative translational movement.

3. A spring suspension according to claim 2 wherein said coupling further comprises a shaft extending along said direction, bushes in said one frame mounting said shaft, means rigidly connecting the shaft to said one linkage arm and means connecting said anchoring spring between said shaft and said one frame, the locking device being operable to lock the shaft to said one frame to prevent relative movement therebetween.

4. A spring suspension according to claim 3 further comprising two spring-abutment plates slidably mounted on said shaft and confining said anchoring spring therebetween, two abutment members fixed at spaced positions on the shaft and confining between them said spring and said two plates, and two stop plates fixed on said one frame but spaced from each other to confine said spring-abutment plates therebetween but having apertures therein through which the abutment members can pass.

5. A spring suspension according to claim 4, having resilient buffers mounted on the shaft and spaced from parts of said one frame to prevent excessive movement of the shaft from damaging the resilient coupling.

* * * * *